United States Patent [19]

Tatsumi

[11] Patent Number: 4,501,175

[45] Date of Patent: Feb. 26, 1985

[54] SPEED CHANGE CONTROL UNIT OF AUTOMATIC TRANSMISSION FOR AUTOMOBILES

[75] Inventor: Takumi Tatsumi, Himeji, Japan

[73] Assignee: Mitsubishi Denki Kabushiki Kaisha, Tokyo, Japan

[21] Appl. No.: 435,100

[22] Filed: Oct. 18, 1982

[30] Foreign Application Priority Data

Oct. 16, 1981 [JP] Japan ................ 56-165950

[51] Int. Cl.³ .................................... B60K 41/22
[52] U.S. Cl. .................................... 74/869; 74/752 A; 74/867
[58] Field of Search ............ 74/867, 868, 869, 752 A; 251/284

[56] References Cited

U.S. PATENT DOCUMENTS

| | | | |
|---|---|---|---|
| 3,570,328 | 3/1971 | Kogaki | 74/867 |
| 3,650,161 | 3/1972 | Ito et al. | 74/866 |
| 3,709,064 | 1/1973 | Schaefer et al. | 74/752 A |
| 3,797,330 | 3/1974 | Ushijima | 74/752 A |
| 3,823,621 | 7/1974 | Kubo et al. | 74/752 A |
| 4,076,210 | 2/1978 | Spielvogel | 251/285 |
| 4,094,211 | 6/1978 | Espenschied | 74/868 |
| 4,252,148 | 2/1981 | Fochtman et al. | 74/869 X |
| 4,308,764 | 1/1982 | Kawamoto et al. | 74/752 A |
| 4,331,046 | 5/1982 | Leonard et al. | 74/867 |
| 4,349,088 | 9/1982 | Ito et al. | 74/869 X |
| 4,385,531 | 5/1983 | Kobayashi et al. | 74/869 |

Primary Examiner—Leslie A. Braun
Assistant Examiner—Dwight G. Diehl
Attorney, Agent, or Firm—Wenderoth, Lind & Ponack

[57] ABSTRACT

The present invention relates to an automatic transmission for automobiles wherein a plurality of transmission ratios are achieved through selective operations of a plurality of hydraulic servo means, and consists in a speed change control unit of an automatic transmission for automobiles wherein hydraulic transfer valves which are operated by oil pressures are arranged between a hydraulic source and hydraulic servos, and the hydraulic transfer valves as desired are operated by combinations of a plurality of oil chambers to be supplied with the pressure oil, thereby to selectively operate the predetermined servo means.

3 Claims, 5 Drawing Figures

SPEED CHANGE CONTROL UNIT OF AUTOMATIC TRANSMISSION FOR AUTOMOBILES

BACKGROUND OF THE INVENTION

This invention relates to a speed change control unit which achieves the speed change transfer control of an automatic transmission for automobiles by means of electric and hydraulic controls.

In general, an automatic transmission for automobiles using electric and hydraulic controls attains a plurality of transmission ratios by electrically detecting the vehicular speed, the throttle opening etc., determining the optimum speed change step in accordance with the running conditions of the automobile, operating predetermined solenoid valves in accordance with the outputs, and selectively operating a plurality of hydraulic servo means. This system has the disadvantages that the number of the solenoid valves increases in correspondence with the number of speed change steps of the transmission, and that the hydraulic control portion means becomes large in size.

SUMMARY OF THE INVENTION

This invention comprises hydraulic transfer valves which operated by oil pressures are arranged between a hydraulic source and hydraulic servos, and the oil pressures for driving the hydraulic transfer valves are applied by an oil pressure distributing valve which includes a plurality of spools that are brought into engagement with adjacent ones and are respectively limited to inherent strokes. The limited stroke occurs when each of the oil chambers defined by the adjacent spools is singly supplied with pressure oil, while the inherent strokes given to the plurality of oil chambers supplied with pressure oil are added up when the oil chambers are supplied with the pressure oil. In accordance with the limited stroke or the added stroke, the oil pressure distributing valve operates to supply or discharge the pressure oil in succession, to actuate the oil pressure transfer valves, thereby to selectively operate the predetermined hydraulic servos and to achieve the speed change operation. According to the present invention, even when the number of speed change steps has increased, the single oil pressure distributing valve suffices. Moreover, the required number of the solenoid valves for actuating the oil pressure distributing valve does not increase in proportion to the increased number of the speed change steps. In addition, the solenoid valves can have a small capacity. It is therefore possible to provide a speed change control unit of an automatic transmission in which both the electronic circuit and the hydraulic circuit are simplified, which is small in size and which has high reliability.

BRIEF DESCRIPTION OF THE DRAWINGS

In the drawings, the same reference numbers indicate the same or corresponding parts.

DESCRIPTION OF THE PREFERRED EMBODIMENTS

The details of the present invention will now be described with reference to the drawings.

Figure 1:
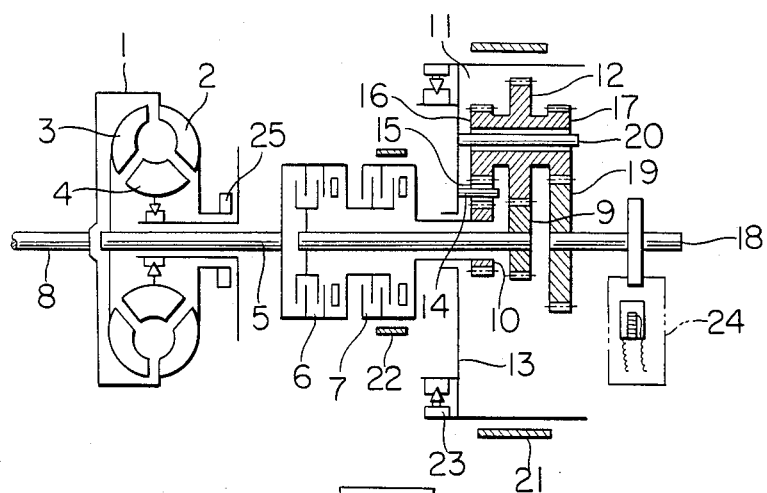
FIG. 1 is a schematic view of a torque converter type automatic transmission for three forward speeds and one reverse speed.

FIG. 1 shows an example of a torque converter type automatic transmission for three forward speeds and one reverse speed. The automatic transmission is constructed of a torque converter, planetary gears, a hydraulic pressure control mechanism, and an electric control circuit.

In the automatic transmission exemplified in FIG. 1, the first forward speed is achieved by actuating a clutch 6 and a brake 21. In this case, the rotation of an engine is fluidly transmitted by an input shaft 8, a torque converter 1 having a pump impeller 2, a turbine liner 3 and a turbine shaft 5 to an input sun gear 9 of a planetary gear system 11 through the engaged clutch 6. Since, at this time, a carrier 13 is held fixed by the brake 21, a pinion shaft 20 is also fixed, and the input rotation is stepped down from the input sun gear 9 through gears 12 and 17 to a gear 19 disposed on an output shaft 18. It is well known that at the first speed, the carrier 13 is substantially fixed by a one-way clutch 23 during drive from the engine side, so the brake 21 need not always be actuated, but it may be actuated only when engine braking is required. Numeral 4 designates the stator of the torque converter.

The second forward speed is attained by actuating the clutch 6 and a brake 22. In this case, input to the planetary gear system 11 is performed by the input sun gear 9 as in the case of the first speed, and a reverse sun gear 10 is held fixed by the brake 22. In addition, since the carrier 13 is released, it rotates, and the rotation of the input sun gear 9 is stepped down at a second speed gear ratio and then transmitted to the gear 19.

The third forward speed is achieved by bringing both clutches 6 and 7 into engagement. In this case, input to the planetary gear system 11 is from both the input sun gear 9 and the reverse sun gear 10. Therefore, the planetary gear system 11 rotates unitarily, and the rotation of the turbine shaft 5 and that of the output shaft 18 rotate together at gear ratio of 1 (one).

The reverse is effected by actuating the clutch 7 and the brake 21. In this case, the carrier 13, accordingly the pinion shafts 14 and 20, are fixed, and input from the turbine shaft 5 is transmitted to the output shaft 18 through the reverse sun gear 10, an idler gear 15, and gears 16, 17 and 19, so that the output shaft 18 rotates reversely to the turbine shaft 5.

A rotation sensor 24 detects the rotation of the output shaft, and produces an electric output proportional to the speed.

Figure 2:
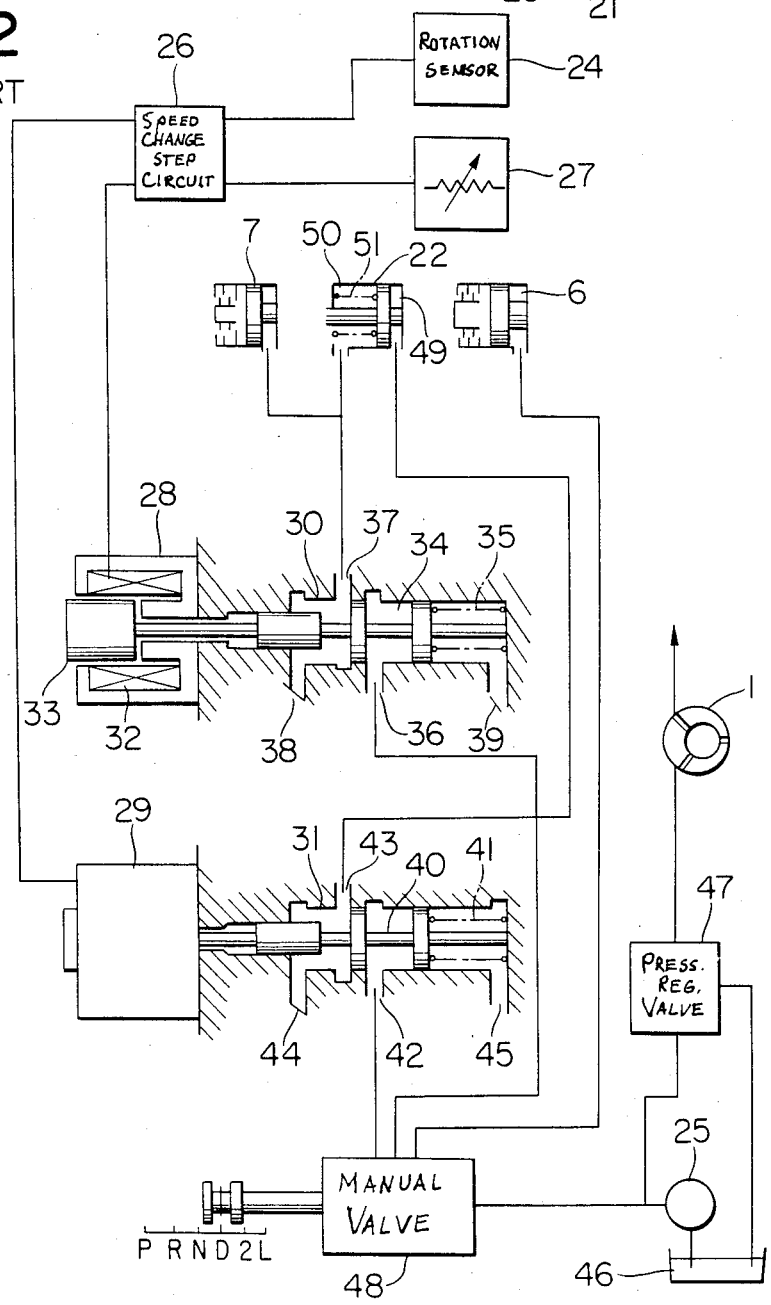
FIG. 2 is a conventional hydraulic circuit in which only parts relevant to the present invention in the device of FIG. 1 are illustrated.
Figure 3:
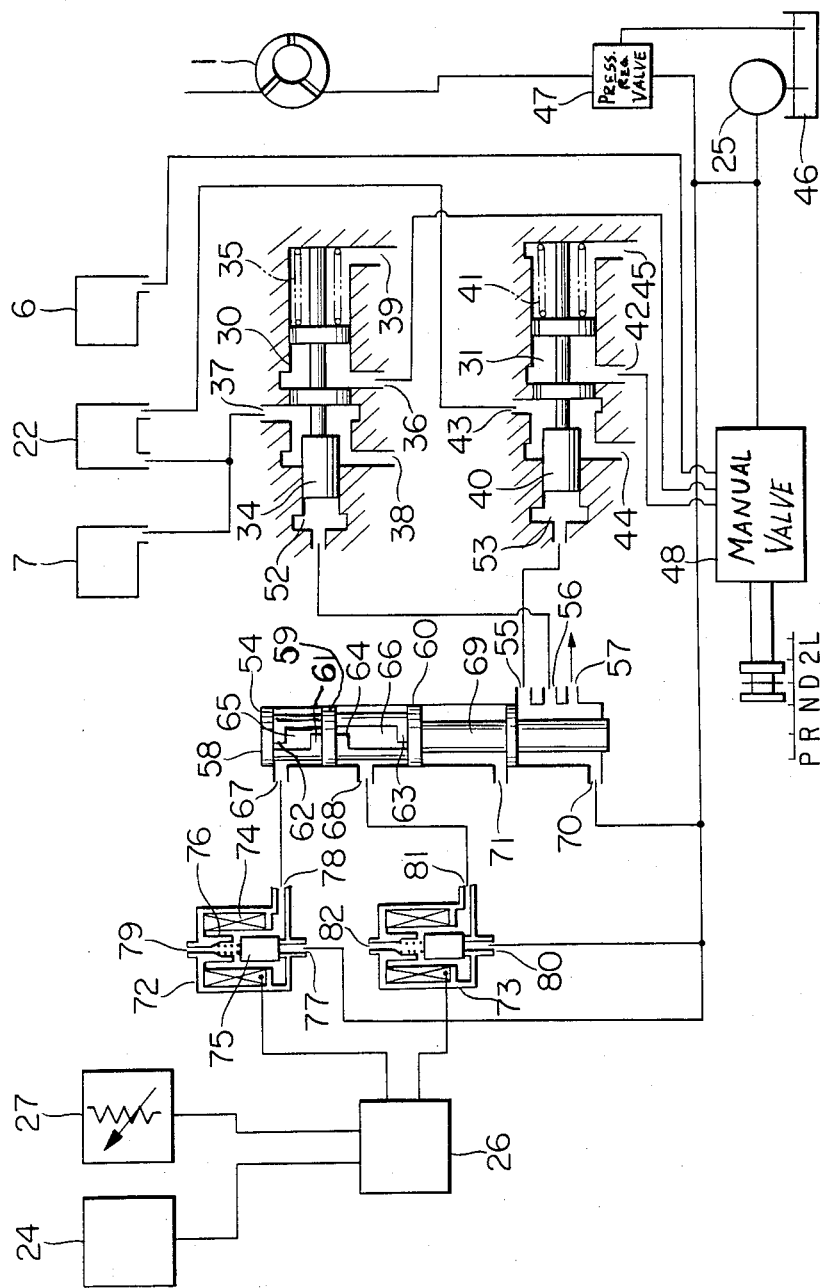
FIG. 3 is an embodiment of a hydraulic circuit according to the present invention for use with the automatic transmission exemplified in FIG. 1.

FIG. 2 shows an example of a conventional device, and illustrates only parts pertinent to a transmission ratio change-over control according to the present invention, in the hydraulic servos of the device in FIG. 1, namely, the hydraulic circuits for controlling the operations of the clutches and brakes. FIG. 3 shows an embodiment of a hydraulic circuit for applying the present invention to the hydraulic circuit of FIG. 2.

Figure 4:
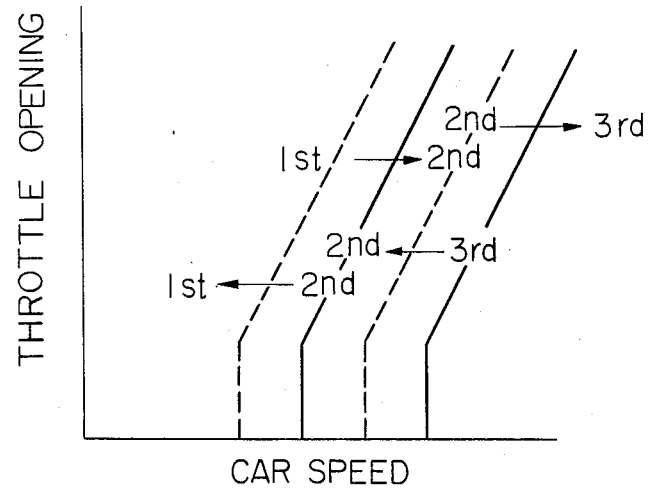
FIG. 4 is a diagram showing the speed change characteristics of an automatic transmission for three forward speeds.

In FIG. 2, a speed change step-determining circuit 26 is an electronic circuit which serves to determine the optimum speed change step corresponding to the running conditions of the automobile. In general, it receives input signals from the rotation sensor 24 which detects the rotational speed of the transmission output shaft, which is generally proportional to the vehicular speed, and an engine throttle opening sensor 27 which uses a potentiometer or the like in order to provide input information concerning the output torque of the engine. It calculates and determines the optimum speed change timing at which the speed change shifts to a higher speed with an increase in the throttle opening as illustrated in FIG. 4. In accordance with such speed change step-indicating state, it turns ON and OFF a 2nd–3rd speed solenoid 28 and a 1st–2nd speed solenoid 29.

In the arrangement of FIG. 2, the first speed is established when both the 2nd–3rd speed solenoid 28 and the 1st–2nd speed solenoid 29 are in the "on" states, the second speed is established when only the 1st–2nd speed solenoid 29 is "off", and the third speed is established when both the solenoids are in the "off" states.

The 2nd–3rd speed transfer valve 30, and the 1st–2nd speed transfer valve 31 are substantially the same in construction, and only the 2nd–3rd speed transfer valve 30 will be described in detail as to the structure and operation.

When the coil 32 of the 2nd–3rd solenoid 28 has been energized by the speed change step-determining circuit 26, a plunger 33 is attracted, and a 2nd–3rd speed spool 34 moves against the force of a spring 35, to establish a position as shown in FIG. 2. As a result, communication between ports 36 and 37 is cut off, and the port 37 is connected with an oil discharge port 38. Next, when the current of the coil 32 has been interrupted by the speed change step-determining circuit 26, the plunger 33 and the spool 34 are moved leftward, as viewed in the figure, by the spring 35 so as to bring the ports 36 and 37 into communication.

The operation of the 1st–2nd speed transfer valve 31 is similar to that of the 2nd–3rd speed transfer valve 30. The operation of the solenoid 29 causes a spool 40 to move against the force of a spring 41 to the position shown in FIG. 2, to cut off the communication between ports 42 and 43 and to connect the port 43 with an oil discharge port 44. On the other hand, when the solenoid 29 has shifted into the "off" state, the port 42 is connected to the port 43. Numerals 39 and 45 designate oil discharge ports for discharging oil which has leaked from the spool 34 or 40.

The operation of the hydraulic control circuit will be explained in accordance with the aspects of operation of the 2nd–3rd speed transfer valve 30 and the 1st–2nd speed transfer valve 31.

A hydraulic pump 25, in general, is normally driven by the shaft part of the pump impeller 2 during the rotation of the engine. Numeral 46 designates an oil receiver in which working oil having passed through the hydraulic circuits is accumulated. Numeral 47 denotes a pressure regulator valve which adjusts the oil pressure of the hydraulic pump 25 to a pressure suitable for the control. Part of the pressure oil passes through the torque converter 1, is cooled by an oil cooler not shown and returns to the oil receiver 46, and part is discharged directly into the oil receiver 46.

Shown at numeral 48 is a manual valve with which the driver of the automobile selects the operation mode of the transmission. In general, it is provided with such ranges as drive ahead (D), hold (2, L), reverse (R), neutral (N) and parking (P), and it supplies a corresponding hydraulic line with the pressure oil in accordance with the selected range. FIGS. 2 and 3 show only hydraulic lines required for describing the present invention in detail.

When, in the stopped state of the automobile, the manual valve 48 is moved to the drive ahead (D) range, the clutch 6 is supplied with the pressure oil directly from the manual valve 48, and it is held in the engaged state normally during the selection of the D range. On the other hand, the speed change step-determining circuit 26 selects the first speed because of zero vehicular speed, the 2nd–3rd speed and 1st–2nd speed solenoids 28 and 29 operate, and the 2nd–3rd speed and 1st–2nd speed transfer valves 30 and 31 move into the states illustrated in FIG. 2. As a result, the clutch 7 has the oil discharged through the oil discharge port 38 and is disengaged. In addition, the brake 22 is released by the action of a spring 51 because both hydraulic chambers 49 and 50 have the oil discharge through the oil discharge ports 44 and 38. Accordingly, the planetary gear system 11 completes the power transmission path for the first speed as described before.

Subsequently, when the 1st→2nd speed-change vehicular speed in FIG. 4, which is determined by the throttle opening, has been reached due to an increase in the vehicular speed, the speed change step-determining circuit 26 generates a signal for the second speed and interrupts the current of the 1st–2nd speed solenoid 29. Accordingly, the spool 40 of the 1st–2nd speed transfer valve 31 is moved leftward by the spring 41 from the state illustrated in FIG. 2, to bring the ports 42 and 43 into communication. As a result, the pressure oil supplied to the port 42 by the manual valve 48 is fed to the hydraulic chamber 49 of the brake 22 through the port 43, and it compresses the spring 51 to actuate the brake 22. On the other hand, the clutch 7 remains in the disengaged state because the oil is discharged by the 2nd–3rd speed transfer valve 30, and the planetary gear system 11 transmits the second speed.

When, due to a further increase in the vehicular speed, the output of the speed change step-determining circuit 26 is changed-over to the third speed, both the solenoids 28 and 29 are placed in the "off" states, and the spool 34 of the 2nd–3rd speed transfer valve 30 moves leftward from the illustrated position of FIG. 2. Accordingly, the pressure oil supplied to the port 36 through the manual valve 48 is supplied to the clutch 7 through the port 37, so that the clutch 7 is brought into engagement. In addition, since both the hydraulic chambers 49 and 50 are supplied with the pressure oil, the oil pressures acting on both the chambers balance, with the result that the brake 22 is released by the action of the spring 51. That is, both the clutches 6 and 7 are held in engagement, and the planetary gear system 11 is unitarily rotated, so that the turbine shaft 5 and the output shaft 18 rotate at an equal speed to establish the third speed state.

While in the above, the upshift in the case where the vehicular speed has increased has been explained, the downshift for enlarging the gear ratio is effected in a similar aspect. As illustrated in FIG. 4, in the same throttle opening state, the speed change operation is carried out at a somewhat lower vehicular speed.

In the above, the speed change operations of the automatic transmission having the three forward speeds have been explained. In a case where the number of speed change steps is still larger, the number of hydraulic servos corresponding to the respective speed change steps increases. In the hydraulic control circuit of the prior-art system, therefore, the number of solenoid valves for speed change transfer increases in proportion to the number of speed change steps. For example, an automatic transmission with four forward speeds requires three solenoid valves for speed change transfer. As the number of speed change steps of the transmission becomes larger, it thus becomes larger in size and more complicated.

The present invention overcomes this disadvantage, and provides a speed change control unit for an automatic transmission which is small in size and high in reliability. Hereunder, the invention will be described in detail with reference to FIG. 3. In FIG. 3, the same or corresponding parts as in FIGS. 1 and 2 are assigned the same reference numerals, and they will not be explained again.

In FIG. 3, the change-over of the oil pressures of the respective ports is the same as in the 2nd-3rd speed transfer valve 30 and the 1st-2nd speed transfer valve 31 in FIG. 2. However, in place of solenoid 28, 2nd-3rd speed transfer valve 30 is operated by the supply of the pressure oil to a driving hydraulic chamber 52 which moves the spool 34 to the position illustrated in FIG. 3, and the discharge of the oil allows the spring 35 to push the spool 34 so as to move leftward in the figure until the ports 36 and 37 come into communication.

Regarding the 1st-2nd speed transfer valve 31, when a driving hydraulic chamber 53 is supplied with the pressure oil, the spool 40 moves to the position illustrated in FIG. 3, and when the oil is discharged, the spool 40 is pushed leftward by the spring 41 until the ports 42 and 43 come into communication. Numerals 38, 39, 44 and 45 designate the oil discharge ports.

An oil pressure distributing valve 54 serves to supply the pressure oil into or discharge it from the driving hydraulic chamber 52 or 53 of each transfer valve. In the embodiment of FIG. 3, it has three output ports 55, 56 and 57. The port 55 is connected to the driving hydraulic chamber 53 of the 1st-2nd transfer valve 31, while the port 56 is connected to the driving hydraulic chamber 52 of the 2nd-3rd transfer valve 30. On account of the three-step automatic speed change, the port 57 is unnecessary and is not used in the embodiment of FIG. 3. It is used, however, in cases of four-step speed change, a three-speed transmission with torque converter lockup control, etc.

Numerals 58, 59 and 60 denote spools which have engagement portions 61, 62, 63 and 64. The spool 58 is held fixed. A hydraulic chamber 65 is defined by the spools 58 and 59, and a hydraulic chamber 66 is defined by the spools 59 and 60. These hydraulic chambers have the pressure oil supplied thereinto or discharged therefrom through control ports 67 and 68. When the pressure oil has been supplied into only the hydraulic chamber 65, the spool 59 is axially moved until the engagement portions 61 and 62 come into engagement. Then an oil pressure distributing spool 69 is moved downward as viewed in FIG. 3, and the port 55 is brought into communication with an oil discharge port 71 so as to discharge the oil. Next, when only the hydraulic chamber 66 has been supplied with the pressure oil, the spool 60 is axially moved until the engagement portions 63 and 64 come into engagement. The oil pressure distributing spool 69 is moved to bring both the ports 55 and 56 into communication with the oil discharge port 71, so that the oil is discharged from both the ports. In the present embodiment, the stroke at the end of which the engagement portions 63 and 64 come into engagement is made double the stroke at the end of which the engagement portions 61 and 62 come into engagement. Accordingly, when the pressure oil has been supplied into the hydraulic chambers 65 and 66 simultaneously, the oil pressure distributing spool 69 has the respective strokes added and moves through a triple stroke as compared to the case where the pressure oil is supplied into the hydraulic chamber 65 alone. Thus, the ports 55, 56 and 57 are connected to the oil discharge port 71. Shown at numeral 70 is a port which supplies the pressure oil, and which is connected to the high pressure side of the hydraulic pump 25.

Figure 5:
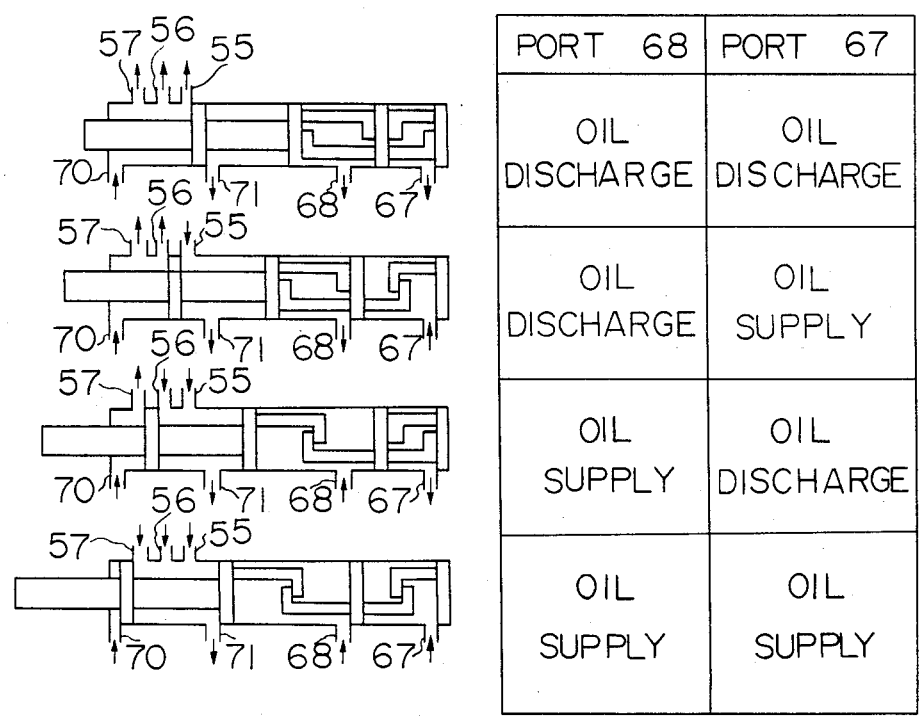
FIG. 5 is a diagram showing the operating states of a hydraulic pressure distributing valve corresponding to operation modes.

FIG. 5 is a diagram which shows the operating states of the oil pressure distributing valve 54 corresponding to the respective operation modes described above.

Numerals 72 and 73 designate solenoid valves which control the supply of the pressure oil to or the discharge from the control ports 67 and 68 of the oil pressure distributing valve 54. Since both the solenoid valves are the same in construction, only the operation of the solenoid valve 72 will be described. In the solenoid valve 72, numeral 74 denotes a coil, and numeral 75 a plunger valve. In the state in which the coil 74 is not energized, the plunger valve 75 closes an input port 77 by means of a spring 76, to bring an output port 78 and an oil discharge port 79 into communication. On the other hand, when current flows through the coil 74, the plunger valve 75 is against the force of the spring 76, to close the oil discharge port 79. Simultaneously therewith, it brings the input port 77 into communication with the output port 78, to supply the pressure oil into the hydraulic chamber 65.

The operation of the solenoid valve 73 is the same as that of the solenoid valve 72 described above. In the deenergized state, an output port 81 is connected with an oil discharge port 82, and the oil is discharged from the hydraulic chamber 66 of the oil pressure distributing valve 54. On the other hand, in the energized state, the output port 81 communicates with an input port 80 so as to supply the pressure oil into the hydraulic chamber 66.

A speed change step-determining circuit 26 executes substantially the same operations as that of the speed change step-determining circuit in FIG. 2. It receives input signals from a rotation sensor 24 and a throttle opening sensor 27, and calculates and determines the optimum speed change step. In accordance with the result of the calculation, it holds both the solenoid valves 72 and 73 in the deenergized states at the the first speed, energizes only the solenoid valve 72 at the second speed, and energizes only the solenoid valve 73 at the third speed. Although this aspect of operation does not apply to the embodiment of FIG. 3, both the solenoid valves 72 and 73 are energized at the same time for attaining a fourth speed in a four-speed transmission, or in case of performing a lockup operation in a three-speed transmission with torque converter lockup. Thus, the port 57 also has the oil discharged therefrom so as to actuate a 3rd-4th speed transfer valve or a lockup operation valve, not shown.

In the above construction, when the speed change step-determining circuit 26 has determined that the first speed is the proper speed on the basis of the input signals from the rotation sensor 24 and the throttle opening sensor 27, it deenergizes both the solenoid valves 72 and 73. As a result, both the hydraulic chambers 65 and 66 of the oil pressure distributing valve 54 have the oil discharged therefrom, to bring the ports 55, 56 and 57 into communication with the port 70. Accordingly, the respective driving hydraulic chambers 52 and 53 of the 2nd-3rd speed transfer valve 30 and the 1st-2nd speed transfer valve 31 are supplied with the pressure oil, and the respective valves move into the illustrated positions states of FIG. 3, in which the clutch 6 is in the engaged condition, the clutch 7 is in the released condition and the brake 22 is in the released condition. Then, the planetary gear system 11 establishes the first speed.

Subsequently, when the second speed has been chosen by the speed change step-determining circuit 26, only the solenoid valve 72 is energized, and the hydraulic chamber 65 of the oil pressure distributing valve 54 is supplied with the pressure oil. Therefore, the port 55 communicates with the oil discharge port 71, and the driving hydraulic chamber 53 of the 1st-2nd speed transfer valve 31 has the oil discharged therefrom. Accordingly, the spool 40 is axially moved by the spring 41, to connect the ports 42 and 43 and to actuate the brake 22. Then, the planetary gear system 11 is brought into the second speed state.

The third speed is attained by deenergizing the solenoid valve 72 and simultaneously energizing the solenoid valve 73. In this case, both the ports 55 and 56 of the oil pressure distributing valve 54 are connected to the oil discharge port 71, and both the ports 37 and 43 of the transfer valves 30 and 31 are supplied with the pressure oil, so that the clutch 7 is brought into engagement and the brake 22 is released. Therefore, the third speed is established.

While in the above, description the embodiment of the present invention has been explained for the case of the three forward speeds, a structure for obtaining four forward speeds can be obtained by adding one more transfer valve and connecting the driving hydraulic chamber thereof to the port 57. Further, where five or more speed change steps are desired, the oil pressure distributing valve 54 is provided with an additional spool and an additional solenoid valve is provided, and the operating stroke obtained with the added spool is quadruple of the stroke when pressure oil has been supplied only into the hydraulic chamber 65. Thus, up to seven transfer valves can be controlled by combining the operations of the three solenoid valves.

As set forth above, the present invention can provide, for an increased number of speed change steps, a speed change control unit of an automatic transmission in which both an electronic circuit and a hydraulic circuit are simplified, which is small in size and which is high in reliability.

While the three-speed automatic transmission has been described as one embodiment of the present invention, the invention is also applicable to a control valve for the lockup control of a torque converter which is carried out to reduce the fuel cost. In this case, the torque converter lockup control can be regarded as the increase of one speed change step.

What is claimed is:

1. In an automatic transmission for automobiles having hydraulic servos for being selectively operated singly or in groups for changing the transmission ratio, an improved speed change control means comprising:
   a plurality of hydraulic transfer valves operable for supplying pressurized hydraulic fluid to said servos from a source of pressurized hydraulic fluid;
   hydraulic actuating means for each of said transfer valves;
   a distributing valve for selectively distributing pressurized hydraulic fluid from said source of fluid to the respective hydraulic actuating means, said distributing valve having a plurality of spool means respectively movable through different maximum length strokes, each being movable through its respective stroke when supplied with pressurized fluid, and said spool means being connected for being moved through a stroke which is the sum of the maximum length strokes of a number of said spool means when the respective spool means of said number of spool means is supplied with pressurized fluid, a valve member connected to said spool means for being moved by said spool means through a stroke corresponding to the stroke through which the spool means is moved, and a plurality of pressure fluid passages and a pressure fluid supply port and a pressure fluid discharge port in said distributing valve, the number of fluid pressure passages being at least one more than the number of spool means, and at least some of said pressure fluid passages being connected to respective ones of said hydraulic actuating means and any remaining fluid passages being for connection to means for carrying out other transmission functions, the movement of said valve member by said spool means controlling the fluid flow between said supply and discharge ports and one or more of said pressure fluid passages in accordance with the stroke of said valve member according to whether one or more of said spool means is moved; and
   a plurality of control valve equal to number to the number of spool means and each connected to a corresponding spool means for supplying pressurized hydraulic fluid to the respective spool means in response to the speed condition of the automatic transmission.

2. An improved speed change control means as claimed in claim 1 in which said spool means are connected for all being moved through the stroke of a respective one of the spool means when said respective one is moved through its stroke for moving said valve member through that stroke, and being further connected for all being moved through a stroke which is the sum of the maximum length strokes of the number of said spool means when the respective spool means of said number of spool means is supplied with pressurized fluid.

3. An improved speed change control means as claimed in claim 1 in which said control valves are solenoid valves.

* * * * *